United States Patent
Davison et al.

[11] Patent Number: 5,810,311
[45] Date of Patent: Sep. 22, 1998

[54] HOLDER FOR VEHICLE SECURITY DEVICE

[76] Inventors: Edward T. Davison, 300 Franklin Ave., Valley Stream, N.Y. 11580; Marvin L. Hartstein, 14 Shore Cliff Pl., Great Neck, N.Y. 11023; Paul Cooper, 211 Cuba Hill Rd., Huntington, N.Y. 11743

[21] Appl. No.: 559,851

[22] Filed: Nov. 22, 1995

[51] Int. Cl.[6] .................................................. A44G 1/10
[52] U.S. Cl. ................................. 248/316.7; 248/229.26; 248/298.1
[58] Field of Search ............................. 248/309.1, 310, 248/313, 314, 315, 316.4, 279.1, 278.1, 298.1, 229.16, 229.26, 228.7, 230.7, 231.81, 316.7; 24/62, 67, 68, 70.2, 70.8; 70/247, 207; 211/60.1, 63, 64; 224/922, 915, 553, 557, 570

[56] References Cited

U.S. PATENT DOCUMENTS

| | | | |
|---|---|---|---|
| 1,789,509 | 1/1931 | Bergstrom | 248/276.1 |
| 1,955,436 | 4/1934 | Mott | 135/13 |
| 2,089,452 | 8/1937 | Utley | 248/316.7 |
| 2,204,692 | 6/1940 | Parisio | 248/38 |
| 2,265,330 | 12/1941 | Waddle | 248/316.7 |
| 2,317,445 | 4/1943 | Davidson | 211/70.8 |
| 2,518,412 | 8/1950 | Wirth | 248/310 |
| 2,537,456 | 1/1951 | Goss | 224/922 |
| 2,599,303 | 6/1952 | Ward | 248/229.26 |
| 3,357,065 | 12/1967 | Anketell | 24/81 |
| 3,601,919 | 8/1971 | Nixon | 248/291.1 |
| 4,009,854 | 3/1977 | Moyer | 248/300 |
| 4,133,131 | 1/1979 | Davy | 211/70.8 |
| 4,360,179 | 11/1982 | Roberts | 248/309.1 |
| 4,738,127 | 4/1988 | Johnson | 70/209 |
| 4,852,780 | 8/1989 | Woodbury | 224/42.45 R |
| 5,129,563 | 7/1992 | Dillon | 224/275 |
| 5,205,446 | 4/1993 | Greenberg | 224/42.03 A |
| 5,222,381 | 6/1993 | Wilcox | 70/19 |

*Primary Examiner*—Ramon O. Ramirez
*Assistant Examiner*—Gwendolyn W. Baxter
*Attorney, Agent, or Firm*—Gerard P. Norton; Rogers & Wells, LLP

[57] ABSTRACT

An apparatus for restricting movement of a device inside a vehicle having a mounting surface therein, wherein the device has a first part and a second part. The apparatus comprising: a holder comprising a support having a first part and a second part; a first receptacle connected to the first part of the support and moveable between a first position and a second position, the first receptacle for receiving the first part of the device when in the first position; and a second receptacle connected to said second part of the support for receiving the second part of the device when the first receptacle is in the second position so that the device is secured by said holder; and a fastener connected to the holder for fastening the holder to the mounting surface of the vehicle so that movement of the device is restricted.

12 Claims, 3 Drawing Sheets

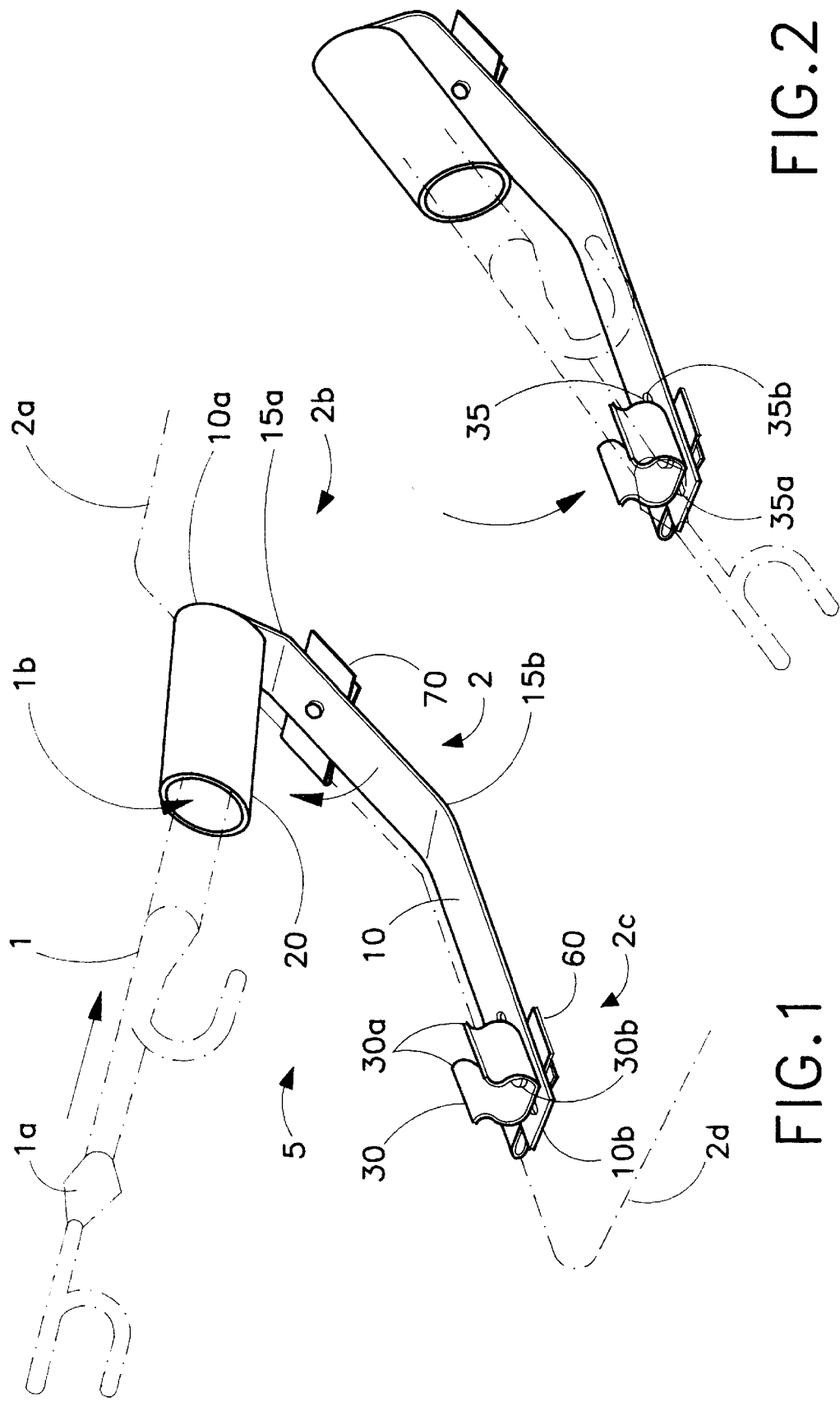

HOLDER FOR VEHICLE SECURITY DEVICE

FIELD OF THE INVENTION

The present invention relates to the art of holders for devices within a vehicle, and, more particularly, to a holder for securely storing a vehicle security device within the passenger compartment of the vehicle during periods of non-use of the security vehicle device.

BACKGROUND OF THE INVENTION

It is of course well known to provide vehicles with anti-theft security devices attachable to the vehicle steering wheel to limit rotation of the steering wheel when the vehicle is parked. One such device is disclosed in U.S. Pat. No. 4,738,127 to Johnson, the subject matter of which is incorporated herein by reference. The device disclosed in the Johnson patent is a steering wheel lock bar characterized by a pair of oppositely directed hooks engagable with diametrically opposite sides of a steering wheel. One of the hooks is on an elongated rod member adapted to move in telescopic fashion relative to a tubular body member carrying the other hook and extending outwardly beyond the periphery of the steering wheel to engage a part of the vehicle and preclude complete rotation of the steering wheel when the lock bar is mounted thereon. When the lock bar is removed from the steering wheel, the rod member is displaced to a storage position within the tubular body member. In this position the oppositely directed hooks are more closely spaced than when the lock bar is mounted on a steering wheel.

It is also known to provide a holder for such security device when the security device is not in use. For example, U.S. Pat. No. 5,222,381 to Wilcox discloses a tethered holder for limiting the range of movement of the security device within the passenger compartment of the vehicle when the security device is detached from the steering wheel and stored in the passenger compartment. This tethered holder includes a tether (e.g., a link chain) of predetermined length, having two ends. A clamp-like holder is attached to the first end of the tether. The clamp-like holder is readily connectable to and disconnectable from the security device. The second end of the tether is secured to a rigidly fixed component of the vehicle, for example, a seat belt retainer mount or vehicle seat support channel. In this manner, when the clamp-like holder is connected to the security device, the range of movement of the security device within the passenger compartment is limited. As a result, the security device will not become a projectile capable of injuring the occupants of the vehicle should the vehicle suddenly stop. This tethered holder, however, does not sufficiently immobilize the security device so as to improve the safety of the occupants of the vehicle.

Holders for devices other than security devices are also known. For example, U.S. Pat. No. 4,009,854 to Moyer discloses a vehicle door-mounted holder for a police officer's club. The holder of the '854 patent includes a U-shaped clip portion and an immovable semicircular socket portion disposed at opposite ends of an intermediate strip. In use, the bottom portion of the police officer's club is inserted into the socket portion. The club rests on a bottom portion of the socket which is closed. The top portion of the club is inserted between two legs of the U-shaped clip. In this manner, the club can be stored on the door of the vehicle. However, the holder disclosed in Moyer suffers from the following problems if used with a vehicle security device: the holder cannot accommodate vehicle security devices with varying lengths or configurations containing projections or non-cylindrical portions because such devices do not fit into a holder designed for placement in a door to avoid door mechanisms or between a door and the vehicle seats; and, the holder does not provide any flexible portions which are adapted to securely hold vehicle security devices when mounted on varying surface configurations in vehicles.

U.S. Pat. No. 3,357,065 to Anketell teaches another holder for a police officer's club. The Anketell patent discloses two U-shaped spring clips secured at opposite ends of an elongated rigid support strip. The support strip is secured to the door of a vehicle whereon the club may be snapped into the U-shaped spring clips for storage. In an alternative embodiment, one of the U-shaped spring clips is provided with an integral extension which prevents pulling the club from the U-shaped spring clips in the longitudinal direction. However, each of these embodiments suffers from the following drawbacks: the holder cannot accommodate vehicle security devices with varying lengths or configurations containing projections or non-cylindrical portions because such devices do not fit into a holder designed for a generally cylindrical device of a generally predefined diameter and length; and, like the holder disclosed in Moyer discussed above, the holder does not provide any flexible portions which are adapted to securely hold vehicle security devices when mounted on varying surface configurations in vehicles.

SUMMARY OF THE INVENTION

The present invention provides a holder adapted to receive and securely store a vehicle security device. The holder can be mounted in the floor of a vehicle passenger compartment (passenger's side) with one end of the holder oriented toward the front end of the vehicle and the other end of the holder directed toward the rear portion of the vehicle. In a preferred embodiment, the holder comprises a support, a tube for receiving one end of the vehicle security device, a U-shaped clip for receiving the other end of the vehicle security device and engaging such device when the holder is in storage position and fasteners to mount the holder to the floor.

In a preferred embodiment of the present invention, the vehicle security device is held securely by moving the tube into the storage position, so that a portion of the vehicle security device is engaged by the U-shaped clip. Further, the support comprises one or more flexible areas which serve to position the tube between a release position of the holder (where the vehicle security device is not secured) and the storage position of the holder (where the vehicle security device is engaged in the U-shaped clip). The flexible areas of the support also allow mounting of the holder to substantially track the curvature of the vehicle floor because the flexible areas accommodate any curvature, angle or slope in the floor or portions thereof.

The vehicle security device is further held securely because the flexible areas of the support act as shock absorbers during operation of the vehicle to minimize any movement in the secured vehicle security device due to operation of the vehicle.

Due to movement of the holder to engage the vehicle security device in the U-shaped clip, the flexible areas allowing mounting of the holder to substantially track any curvature in the floor of the vehicle and the flexible areas of the support acting as shock absorbers during operation of the vehicle, the holder is adapted to securely store any vehicle security device. Each of these advantages of the holder constructed in accordance with the present invention are heretofore unknown in the prior art.

BRIEF DESCRIPTION OF THE DRAWINGS

Representative embodiments of the present invention will be described with reference to the following drawings, wherein:

FIG. 1 is a perspective view of a holder shown in a release position and containing a vehicle security device (broken line).

FIG. 2 is a perspective view of the holder shown in a storage position and containing the vehicle security device (broken line).

DESCRIPTION OF PREFERRED EMBODIMENT

Figure 7:
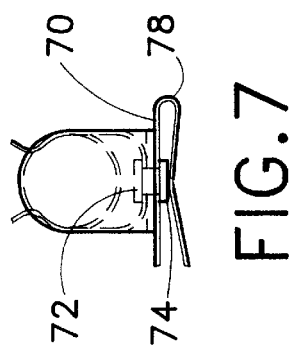
FIG. 7 is another enlarged end view of the holder.

FIGS. 1 and 2 show a perspective view of a preferred embodiment of a holder 5 constructed in accordance with the present invention. In FIG. 1, the holder 5 is shown in a release position while in FIG. 2, the holder 5 is shown in a storage position. These figures also illustrate mounting the holder 5 in a vehicle passenger compartment (passenger's side) on a floor 2. A floor edge 2a is oriented toward the front end of the fire wall of the vehicle, while a floor edge 2d is oriented toward the rear end of the vehicle. As described in greater detail below, the holder 5 is adapted to receive and securely store a device 1.

One such device 1 that can be used with the holder of the present invention is a vehicle security device of the type disclosed in U.S. Pat. No. 4,738,127 ("the vehicle security device"), referred to previously. Of course, other devices, including other vehicle security devices, may be used in connection with the present invention. However, for the purpose of illustrating a preferred embodiment, reference is made to the vehicle security device 1.

The holder 5 according to one representative embodiment of the present invention comprises a support 10, a tube 20, a U-shaped clip 30, a fastener base 60 and a fastener base 70. The holder 5 is securely mounted to the floor 2 in a position as follows: A first end 10a of the support 10 is oriented toward a floor edge 2a; a second end 10b of the support 10 is directed toward a floor edge 2d. The first end 10a is located in a fire wall area 2b, while the second end 10b is located in a level area 2c of the floor 2. Mounting of the holder 5 substantially tracks the curvature of the floor 2 due to support 10.

The support 10 comprises a first flexible area 15a which allows the support 10 to substantially track any angle, curvature or sloping in the fire wall area 2b. The support 10 further comprises a second flexible area 15b which allows the support 10 to substantially track the curvature of the floor 2 by accommodating any angle or curvature between the fire wall area 2b and the level area 2c. The holder 5 accordingly fits securely in any configuration of the floor 2 (for example, in various vehicle brands or models) because any variation in the curvature, angle or slope of any area of the floor 2 is accommodated by the flexible areas 15a and 15b.

The first flexible area 15a also serves to position the tube 20 between a release position (shown in FIG. 1) and a storage position (shown in FIG. 2). In the receiving position (shown in FIG. 1), the tube 20 is positioned away from the support 10 to receive a handle part 1b of the vehicle security device 1. Once the handle part 1b is inserted into the tube 20, the tube 20 is moved into the storage position (shown in FIG. 2).

We have found that the first and second flexible areas 15a and 15b improve operability for the following reasons: allowing the support 10 to substantially track the curvature of the floor 2 (which can vary depending upon the vehicle); allowing for ease of placement of the vehicle security device because insertion is more easily accomplished due to the elevation of tube 20; and, securely positioning the tube 20 between a release position and a storage position.

The vehicle security device 1 is held securely as follows. In one representative embodiment, at the second end 10b of the support 10, there is the U-shaped clip 30. Moving the tube 20 into the storage position causes an intermediate part 1a of the vehicle security device 1 to be engaged, and therefore held securely, by the U-shaped clip 30. The U-shaped clip 30 is moveable between an end 35a and an end 35b of a groove 35 which is formed within the support 10. In an alternative embodiment, a first end 30a the U-shaped clip 30 is moveable to tilt upwards towards the first end 10a of the support 10 in relation to the plane defined by the portion of the support 10 located in the level area 2c of the floor 2. We have found it is advantageous to have the U-shaped clip 30 moveable and able to tilt because the U-shaped clip 30 can be positioned to receive a portion of the vehicle security device 1 best adapted for secure engagement with the U-shaped clip 30. We have further found it is advantageous to have the U-shaped clip 30 able to tilt because a flat portion 30b of the U-shaped clip 30 can be aligned with the angle of insertion of the vehicle security device 1 in relation to the plane defined by the portion of the support 10 located in the level area 2c of the floor 2 to further securely hold the entire portion of the device 1 in contact with the U-shaped clip 30.

The vehicle security device 1 is further be held securely because the flexible areas 15a and 15b act as shock absorbers during operation of the vehicle to minimize any movement in the secured vehicle security device 1 during operation of the vehicle.

Figure 3:
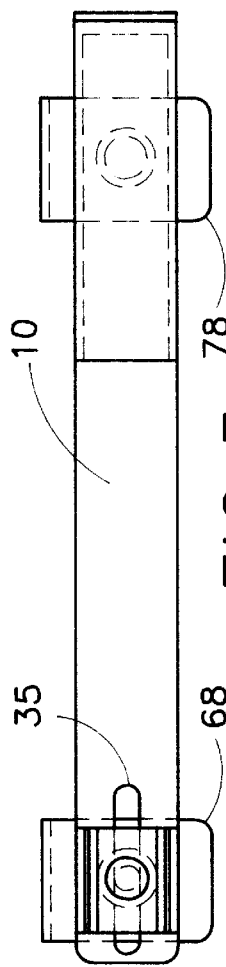
FIG. 3 is an overhead view of the holder shown in the storage position.
Figure 4:
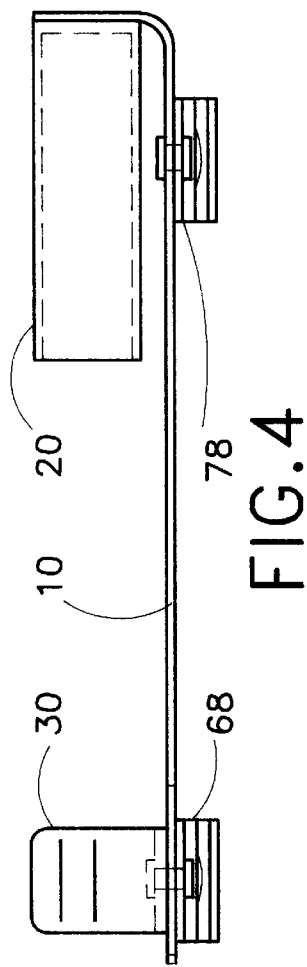
FIG. 4 is an lateral view of the holder shown in the storage position.
Figure 5:
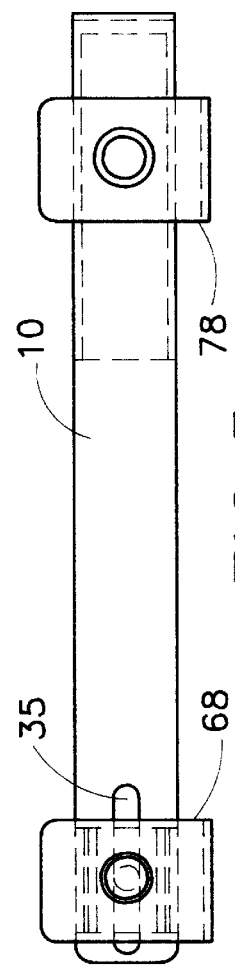
FIG. 5 is a bottom view of the holder shown in the storage position.

FIGS. 3–5 show the holder 5 from various perspectives. Specifically, FIG. 3 is an overhead view, FIG. 4 is an lateral view and FIG. 5 is a bottom view of a representative embodiment of the holder constructed in accordance with the present invention. These FIGS. 3–5 also illustrate, in one representative embodiment, the flexibility of the first and second flexible areas 15a and 15b to allow the support 10 to be contained in one plane, thereby allowing the support 10 to substantially track the floor 2 which, in this representative embodiment, is level.

Figure 6:
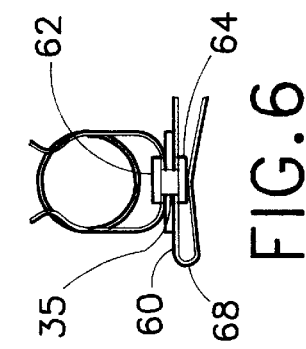
FIG. 6 is an enlarged end view of the holder.

FIG. 6 is an enlarged end view depicting how the U-shaped clip 30 is secured to the holder 5. More particularly, a bolt 62 is inserted through a fastener base 60, the groove 35 and the base of the U-shaped clip 30. A nut 64 is threaded to the bolt 62 to secure the U-shaped clip 30 to the support 10.

In FIG. 7, a bolt 72 is inserted through a fastener base 70 and the support 10. A nut 74 is threaded to the bolt 72 to secure the fastener base 70 to the support 10.

Figure 8:
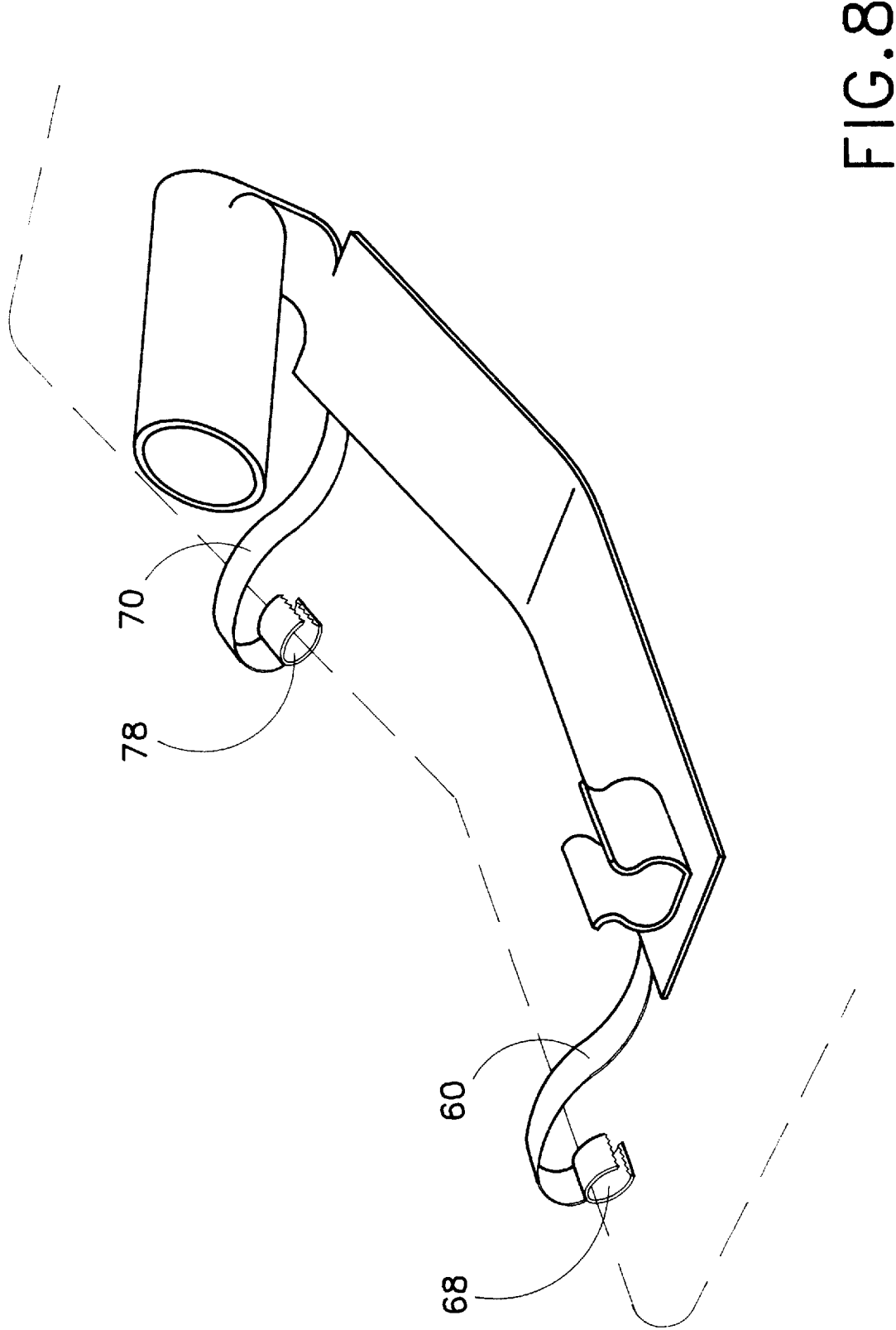
FIG. 8 is a perspective view of the holder shown in a release position with a plurality of fasteners comprising metal spring loaded clamps having teeth which adhere to the mounting surface.

Attached to the fastener bases 60 and 70 are fasteners 68 and 78 respectively. In another representative embodiment, as shown in FIG. 8, the fastener bases 60 and 70 are woven nylon strips and the fasteners 68 and 78 are metal spring loaded clamps with teeth so as to attach to the floor 2 which is usually carpeted. However, any other suitable fastening apparatus may be used.

The support 10, in a preferred embodiment representative of the present invention, can be formed of a single piece of plastic having the first and second flexible areas 15*a* and 15*b* integrally formed therein. In other representative embodiments, the support can be formed of a metallic material or any other suitable substance. In another representative embodiment, hinges can be substituted for the first and second flexible areas 15*a* and 15*b*. Thus, the support 10 need not be formed of a single piece of material. The hinges can be formed of metal or any suitable material. Where the support 10 construction is non-unitary, any suitable means of fastening the separate pieces can be used.

The tube 20 is connected to the support 10 at the first end 10*a* , above the first flexible area 15*a*. In representative embodiments, the tube 20 can be made of steel or any other suitable material. Welding the tube 20 to the support 10 permits the tube 20 and support 10 to be integrally formed. In an alternative embodiment, the support 10 and the tube 20 can be formed of a single piece of material.

By providing examples of materials for use in alternative embodiments of the present invention, there is no intention to limit the materials so. Rather, the materials can consist of any material or combination of materials suitable for achieving the concepts underlying the invention. The materials may be known to a person skilled in the applicable art. However, the present invention is not dependent on any one material for its construction. Therefore, materials which become known to a person skilled in the art would be within the scope of the invention.

While the representative embodiment according to the present invention described herein is directed to a holder for securely storing a vehicle security device within the passenger compartment of the vehicle, the principles of the present invention are also applicable to a holder for securing objects on both curved or level surfaces in object, for example, vehicles, in motion.

We claim:

1. An apparatus for restricting movement of a vehicle security device inside a vehicle having a mounting surface therein, wherein the vehicle security device has a first part and a second part, the apparatus comprising:
   (a) a holder comprising
      (i) a support having a first part and a second part including a first flexible area between said first part and said second part;
      (ii) a first receptacle connected to said first part of said support, said first part including a second flexible area which allows said first receptacle to be moveable between a first position and a second position, said first receptacle for receiving the first part of the vehicle security device when in said first position; and
      (iii) a second receptacle connected to said second part of said support for receiving the second part of the vehicle security device when said first receptacle is in said second position so that the vehicle security device is secured by said holder; and
   (b) a fastener connected to said holder for fastening said holder to the mounting surface of the vehicle so that movement of the vehicle security device is restricted.

2. The apparatus of claim 1 wherein said second part of said support comprises a third part and a fourth part, said third part of said support moveable between a third position and a fourth position for aligning said third part of said support and said fourth part of said support with the mounting surface.

3. The apparatus of claim 1 wherein said second part of said support further comprises a groove having a first end and a second end disposed longitudinally therein and wherein said second receptacle is connected to said second part of said support through said groove so that said second receptacle is moveable between said first and second ends.

4. The apparatus of claim 1 wherein said support is formed of plastic.

5. The apparatus of claim 1 wherein said support is of unitary construction.

6. The apparatus of claim 1 wherein said first flexible area comprises a hinged portion.

7. The apparatus of claim 1 wherein said second flexible area comprises a hinged portion.

8. The apparatus of claim 1 wherein said first receptacle is connected to said first part of said support by welding.

9. The apparatus of claim 1 wherein said first receptacle comprises a tube.

10. The apparatus of claim 1 wherein said second receptacle comprises a U-shaped clip.

11. An apparatus for restricting movement of a device inside a vehicle having a mounting surface therein, wherein the device has a first part and a second part, the apparatus comprising:
    (a) a holder comprising
       (i) a support having a first part and a second part including a first flexible area between said first part and said second part;
       (ii) a first receptacle connected to said first part of said support, said first part including a second flexible area which allows said first receptacle to be moveable between a first position and a second position, said first receptacle for receiving the first part of the vehicle security device when in said first position; and
       (iii) a second receptacle connected to said second part of said support for receiving the second part of the device when said first receptacle is in said second position so that the device is secured by said holder; and
    (b) a fastener connected to said holder for fastening said holder to the mounting surface of the vehicle so that movement of the device is restricted, wherein said fastener comprises two metal spring loaded clamps having teeth which adhere to the mounting surface.

12. An apparatus for restricting movement of a device inside a vehicle having a mounting surface therein, wherein the device has a first part and a second part, the apparatus comprising:
    (a) a holder comprising
       (i) a support having a first part and a second part including a first flexible area between said first part and said second part;

(ii) a first receptacle connected to said first part of said support, said first part including a second flexible area which allows said first receptacle to be moveable between a first position and a second position, said first receptacle for receiving the first part of the vehicle security device when in said first position; and (iii) a second receptacle connected to said second part of said support for receiving the second part of the device when said first receptacle is in said second position so that the device is secured by said holder, said second receptacle comprising a U-shaped clip; and (b) a fastener connected to said holder for fastening said holder to the mounting surface of the vehicle so that movement of the device is restricted, wherein said fastener comprises two metal spring loaded clamps having teeth which adhere to the mounting surface.

* * * * *